United States Patent Office 3,088,835
Patented May 7, 1963

3,088,835
THERMALLY DEVITRIFIABLE SEALING GLASSES
Perry P. Pirooz, Toledo, Ohio, assignor to Owens-Illinois Glass Company, a corporation of Ohio
No Drawing. Filed Sept. 15, 1961, Ser. No. 138,298
2 Claims. (Cl. 106—53)

This invention relates to thermally devitrifiable sealing glasses. In a more specific aspect, the invention relates to thermally devitrifiable sealing glasses capable of withstanding relatively high temperatures in the devitrified state. In copending application Serial Number 658,015, filed May 9, 1957, there are disclosed and claimed devitrifiable sealing glasses capable of making devitrified seals to compatible materials at temperatures of about 425° C. Such glasses are useful for sealing to hard glasses having coefficients of expansion from 0° to 300° C. in the range of about 80–120×10⁻⁷. Such glasses are of importance in certain areas, for instance, in the sealing of color television bulbs and can withstand operating temperatures after devitrification in the neighborhood of the sealing temperatures of about 425° C. Sealing glasses said to have about the same uses and characteristics when devitrified are disclosed in Claypoole Patent 2,889,952, issued June 9, 1959. Glasses of similar composition and characteristics are also disclosed in Belgian Patent 576,999.

The foregoing glasses are not suitable for sealing to low expansion hard glasses having coefficients of expansion in the range from about 35 to about 50×10⁻⁷ (0–300° C.) because of the incompatibility of the expansion coefficients. The glasses of the invention are especially applicable to sealing to hard glasses having an expansion coefficient of about 40–45×10⁻⁷ (0–300° C.). There is a need for sealing a number of the important glasses for electronic uses which have expansion coefficients in this range with a material that can withstand operating temperatures of 650° C. or higher without disturbing the seal.

It is therefore an object of the present invention to provide devitrifiable glass compositions that can be devitrified at temperatures in the range from 675° to 750° C. Another very important object of the invention is to provide devitrifiable sealing glass compositions that can be devitrified by heat treatment for ½ to 1 hour in the temperature range from 675° to 750° C. with a change of no more than about 5×10⁻⁷ in the coefficient of expansion (0–300° C.) when comparing the expansion of the devitrified state to the vitreous state.

According to the present invention, I have discovered glass compositions that can be sealed to compatible hard glasses by heating to a temperature within the range of 675–750° C. and holding at a temperature in that range for a period of from ½ to 1 hour to obtain a devitrified seal between the glass and the sealing glass. The present sealing glasses are compatible with materials having thermal expansion coefficients within a range of 35–50×10⁻⁷, especially 40–45×10⁻⁷ (0–300° C.), have a liquidus temperature above 1900° F. a fiber softening point above 600° C. but below 700° C. in the vitreous state, are capable of thermal devitrification within a period of 1 hour at a temperature within the range from 675–750° C., and have a composition of about 5 weight percent PbO, 17–19 weight percent B₂O₃, 59–61 weight percent ZnO, 14–16 weight percent SiO₂, and 2–3 weight percent CuO.

The glasses usually consist of the above components in the stated amounts, but can have minor amounts of other ingredients present, as discussed hereafter.

I have discovered that the glass compositions of the invention have the very important feature that when they are devitrified by heating at the rate of about 10° C. per minute to a temperature in the range of 675°–750° C., held at a temperature in said range for a time from ½ to 1 hour while devitrification occurs, and then cooled at a rate of about 5° C. per minute, they undergo a coefficient of thermal expansion (0–300° C.) change from the vitreous state to the devitrified state of, at most, 5×10⁻⁷. This is an especially valuable feature since this tends to prevent trouble with tiny hairline cracks sometimes forming within the structure of a devitrified sealing glass because of the difference in the coefficient of expansion between the vitreous and the crystalline phases. The small percentage of copper oxide is essential and contributes importantly to the overall desirable properties of the present sealing glasses and, in particular, its presence in the defined compositions makes possible a glass of the desired properties which has the very desirable feature just mentioned, a difference in coefficient of thermal expansion of the glasses in the vitreous as compared with the devitrified state of no more than 5×10⁻⁷. The copper oxide gives the glass a wider glassy range, that is, a larger difference in the temperature between the point at which a powdered glass will first fuse to the glassy state and the temperature at which the glass will begin devitrification in a particular length of time, for instance, one hour.

It is believed that the presence of the copper oxide retards or limits the devitrification and in this way contributes to making the coefficient of expansion of the vitreous and devitrified glass nearly the same. The presence of the copper oxide also serves to lower the liquidus temperature.

In making a seal, say between two hard glass parts, one or both of the surfaces of the glass parts to be joined is coated with a powder or particulate sealing glass and the parts are brought together and heated until a seal is formed and the sealing glass has devitrified and thereafter the parts are cooled. In this manner the seal is devitrified homogeneously throughout and not merely from the surface. For convenience, the powder is usually mixed with a liquid vehicle to form a paste. Such vehicles are well-known and include cellulose acetate, nitrocellulose, and even water. In any case, the vehicle is one which is either evaporated or decomposed or both during the sealing process. For instance, a dilute solution of nitrocellulose in amyl acetate can be suitably employed.

It is difficult to determine the degree of devitrification, in other words, the weight percent of the devitrified sealing glass that is in crystalline form, but in any case, at least a portion of the sealing glass remains in the vitreous state and acts as a binder. The invention covers glasses capable of any amount of devitrification which makes the glass increase in viscosity.

The following examples illustrate the invention.

*Example I*

A devitrifiable sealing glass having a theoretical composition by weight of 5 weight percent PbO, 18 weight percent B₂O₃, 60 weight percent ZnO, 15 weight percent SiO$_2$ and 2 weight percent CuO was prepared by mixing 17.7 parts by weight of lead silicate (85 percent PbO, 15 percent SiO$_2$), 43.45 parts by weight flint, 55.6 parts by weight anhydrous boric oxide, 180.0 parts by weight zinc oxide and 6.0 parts by weight cupric oxide to obtain a substantially homogeneous mixture and then melting the mixture in an electric furnace in a platinum container, using a furnace temperature of 2200° F. and 2 hours. Thereafter the glass was poured out of the container and fritted in a conventional manner. This glass was found to have a coefficient of thermal expansion over the range from 0 to 300° C. of about $40.5 \times 10^{-7}$. When devitrified, the expansion coefficient is slightly lower. This glass is an example of one of the narrow range of glass compositions of the invention that can be devitrified as set forth in the specification with a change of less than $5 \times 10^{-7}$ in the expansion coefficient over the range 0–300° C. The liquidus temperature of this glass was about 2065° F. The fiber softening point was about 630° C. When a sample of this glass as a powder passing 140 mesh was compressed, heated to 685° C. at a rate of about 10° C. per minute, held at 685° C. for 1 hour, and then cooled at a rate of about 5° C. per minute, the resulting devitrification product had a thermal expansion coefficient (0–300° C.) of $36.4 \times 10^{-7}$ cm./cm./° C.

Seals were made with this sealing glass, sealing the glass of the example to a planar surface of a hard glass part made from a silica-alumina-dolomite glass substantially identical with glass A of Table I in Patent No. 2,961,328. This glass has an annealing point temperature of about 775° C. and a coefficient of thermal expansion (0–300° C.) of about $42 \times 10^{-7}$. The glass was crushed to a powder that passed 180 mesh screen and was then mixed with a vehicle comprising about 1 weight percent of nitrocellulose in amyl acetate, using enough of the vehicle to give a workable paste. The paste was then applied to the surface of the glass part, air dried and then fired, employing the heating schedule described in the specification, with the upper sealing and devitrification temperature being 675° C. Two similar seals were made where the devitrification temperature was 700° C. and 725° C., respectively. The stresses were then measured in the hard glass to determine the stress obtained in the seals. At 675° C. devitrification temperature the stress in the hard glass was 470 lbs. per square inch compression, at 700° C. the stress was 210 lbs. per square inch tension, and at 725° C. the stress was 810 lbs. per square inch tension.

The specimens were prepared for these stress measurements by grinding down the seal edges to obtain two plane parallel surfaces perpendicular to the interface between the sealing glass and the hard glass. The existing stress in the hard glass was then determined by measuring the retardation of polarized light by means of a polarimeter. A monochlorobenzene tank was provided for immersing the sample to facilitate the observation of the stress pattern through the ground glass. The retardation data were then used to calculate the stress in lbs. per square inch by the following well-known relationship:

$$S = \frac{R \times K}{l}$$

Where:

S is the stress in p.s.i.
R is the retardation in millimicrons
$l$ is the light path length in cm.
K is the multiplying factor which is obtained from the following equation:

$$K = \frac{14.22}{C}$$

Where: C is the stress optiacl coefficient expressed in mu./cu./kg./cm.$^2$.

Similarly, a double seal was made in the same manner, sealing two matching planar surfaces of glass parts of the same hard glass, using a devitrification temperature of 700° C. The hard glass parts so sealed were under low tensional stress.

*Example II*

Another devitrifiable sealing glass was prepared in the same manner as the glass was prepared in Example I. The theoretical composition of this glass was 5 weight per cent PbO, 18 weight percent B$_2$O$_3$, 59 weight percent ZnO, 15 weight percent SiO$_2$ and 3 weight percent CuO. This glass had a liquidus temperature of about 2050° F. and a fiber softening point somewhat above 600° C. Seals were made to the same hard glass described in Example I at temperatures of 675° C., 700° C. and 725° C. and the stresses in the hard glass were all low, showing this sealing glass to be compatible with the hard glass. This glass is another example of the devitrifiable sealing glasses of the invention having a change in coefficient of expansion less than $5 \times 10^{-7}$ over the range 0–300° C., comparing the vitreous glass with the devitrified glass.

As stated, the copper oxide in the compositions of the invention is essential and contributes importantly to the close agreement between the coefficient of expansion in the vitreous and devitrified states. Another glass which I previously prepared, containing no copper oxide, had a number of overall desirble sealing properties, but underwent a large change in the coefficient of expansion as it went from the vitreous to the highly devitrified state. This glass had the composition: 5 parts by weight PbO, 22 parts by weight B$_2$O$_3$, 60 parts by weight ZnO, and 13 parts by weight SiO$_2$. Seals were made with this glass to the same hard glass as used in Example I and the seals were made in the same manner. Four seals were made with the devitrification temperatures being 650° C., 675° C., 700° C., and 725° C., respectively. The very large change in the coefficient of expansion is shown by the stress in the respective seals, going from the seal made at 650° C. with only a small amount of devitrification to the most highly devitrified seal made at 725° C. These stresses were, respectively, 1170 p.s.i. compression in the hard glass, 1070 p.s.i. compression in the hard glass, 110 p.s.i. tension in the hard glass, and 1400 p.s.i. tension in the hard glass, a total change from the seal made at 650° C. to the seal made at 725° C. of 2570 p.s.i. This demonstrates the very large difference in the expansion coefficient of the glass in the vitreous and devitrified states.

While the glasses of the invention can consist essentially of the named components in the proportions set forth herein, it will be obvious to the glass-maker that minor portions of other ingredients, other glass-forming oxides which are compatible with the compositions, can be judiciously added to the compositions without materially changing the basic and novel characteristics of the glasses defined herein and in the claims, and that such minor modifications are contemplated.

In the specification the term "hard glass" is intended to mean a high fiber softening point glass which has been given a retainable shape, either by melting or otherwise, and which, at the sealing temperature employed in the range from 675–750° C., retains such shape.

Although the invention has been described with respect particularly to sealing glasses as being useful for sealing hard glass parts, it is also understood that the sealing glasses are useful for sealing other materials such as metals with compatible expansion characteristics and for the sealing of hard glasses to metals.

As will be evident to those skilled in the art, various modifications of this invention can be made or followed in the light of the foregoing disclosure and discussion without departing from the spirit and scope of the disclosure or from the scope of the claims.

I claim:
1. A glass that is compatible with materials having thermal expansion coefficients within a range of 35–50×10$^{-7}$, has a liquidus temperature above 1900° F., a fiber softening point above 600° C. but below 700° C. in the vitreous state, is capable of thermal devitrification within a period of 1 hour at a temperature within the range from 675–750° C. and consists essentially of about 5 weight percent PbO, 17–19 weight percent $B_2O_3$, 59–61 weight percent ZnO, 14–16 weight percent $SiO_2$ and 2–3 weight percent CuO.

2. A glass according to claim 1 having a composition consisting essentially of about 5 weight percent PbO, 18 weight percent $B_2O_3$, 60 weight percent ZnO, 15 weight percent $SiO_2$, and 2 weight percent CuO.

References Cited in the file of this patent
UNITED STATES PATENTS
2,889,952    Claypoole _____ June 9, 1959